(12) United States Patent
Uta et al.

(10) Patent No.: US 11,518,884 B2
(45) Date of Patent: Dec. 6, 2022

(54) ROOM-TEMPERATURE-CURABLE ORGANOPOLYSILOXANE COMPOSITION, STRUCTURE, AND METHOD FOR ASSESSING CURED STATE OF SAID COMPOSITION

(71) Applicant: SHIN-ETSU CHEMICAL CO., LTD., Tokyo (JP)

(72) Inventors: Akira Uta, Annaka (JP); Takafumi Sakamoto, Annaka (JP)

(73) Assignee: SHIN-ETSU CHEMICAL CO., LTD., Tokyo (JP)

(*) Notice: Subject to any disclaimer, the term of this patent is extended or adjusted under 35 U.S.C. 154(b) by 209 days.

(21) Appl. No.: 16/971,944

(22) PCT Filed: Dec. 27, 2018

(86) PCT No.: PCT/JP2018/048241
§ 371 (c)(1),
(2) Date: Aug. 21, 2020

(87) PCT Pub. No.: WO2019/163290
PCT Pub. Date: Aug. 29, 2019

(65) Prior Publication Data
US 2020/0392339 A1 Dec. 17, 2020

(30) Foreign Application Priority Data
Feb. 22, 2018 (JP) .............................. JP2018-029700

(51) Int. Cl.
| | |
|---|---|
| *C08L 83/06* | (2006.01) |
| *C08K 3/36* | (2006.01) |
| *C08K 5/1535* | (2006.01) |
| *C08K 5/5425* | (2006.01) |
| *C08K 5/5465* | (2006.01) |
| *C08G 77/18* | (2006.01) |
| *C08G 77/385* | (2006.01) |
| *C08G 77/16* | (2006.01) |
| *C08G 77/24* | (2006.01) |
| *C08L 83/08* | (2006.01) |
| *C08L 83/04* | (2006.01) |
| *C08G 77/14* | (2006.01) |

(Continued)

(52) U.S. Cl.
CPC .............. *C08L 83/06* (2013.01); *C08G 77/04* (2013.01); *C08G 77/14* (2013.01); *C08G 77/16* (2013.01); *C08G 77/18* (2013.01); *C08G 77/24* (2013.01); *C08G 77/38* (2013.01); *C08G 77/382* (2013.01); *C08G 77/385* (2013.01); *C08K 3/36* (2013.01); *C08K 5/1535* (2013.01); *C08K 5/5425* (2013.01); *C08K 5/5465* (2013.01); *C08L 83/04* (2013.01); *C08L 83/08* (2013.01); *C08J 2383/04* (2013.01); *C08J 2383/06* (2013.01); *C08J 2383/08* (2013.01); *C08L 2312/00* (2013.01)

(58) Field of Classification Search
CPC .... C08G 77/38; C08G 77/385; C08G 77/382; C08G 77/24; C08G 77/18; C08G 77/16; C08G 77/14; C08G 77/04; C08L 2312/00; C08L 83/08; C08L 83/04; C08L 83/06; C08J 2383/08; C08J 2383/06; C08J 2383/04; C08K 5/5465; C08K 5/5425; C08K 5/1535; C08K 3/36
USPC ...................................................... 525/477
See application file for complete search history.

(56) References Cited

U.S. PATENT DOCUMENTS

2006/0173126 A1 8/2006 Araki
2007/0282047 A1 12/2007 Kimura et al.
(Continued)

FOREIGN PATENT DOCUMENTS

| CN | 107652689 A | 2/2018 |
|---|---|---|
| EP | 2 695 910 A1 | 2/2014 |

(Continued)

OTHER PUBLICATIONS

International Search Report (PCT/ISA/210) issued in PCT/JP2018/048241 dated Apr. 9, 2019.
(Continued)

*Primary Examiner* — David T Karst
(74) *Attorney, Agent, or Firm* — Birch, Stewart, Kolasch & Birch, LLP

(57) ABSTRACT

A room-temperature-curable organopolysiloxane composition; a structure obtained from the composition; and a method for assessing the cured state of the composition are provided. The room-temperature-curable organopolysiloxane composition, which changes in color with the progress of curing from the uncured state, comprises the following ingredients: (A) 100 parts by mass of one or more organopolysiloxanes represented by formula (1)

$$HO(SiR_2O)_nH \quad (1)$$

and/or formula (2)

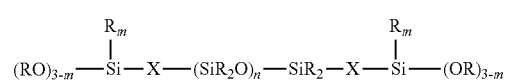

(2)

(with variables as defined herein); (B) 0.1-50 parts by mass of an organosilicon compound having at least three silicon-atom-bonded hydrolyzable groups in the molecule, which is not any of ingredients (A), (C), and (D), and/or a product of the partial hydrolytic condensation of the organosilicon compound; (C) 0.01-20 parts by mass of a curing catalyst;

(Continued)

(D) 0.1-10 parts by mass of a silane coupling agent; and (E) 0.01-10 parts by mass of a pH indicator.

9 Claims, No Drawings

(51) Int. Cl.
　　　*C08G 77/04*　　　(2006.01)
　　　*C08G 77/382*　　(2006.01)
　　　*C08G 77/38*　　　(2006.01)

(56) References Cited

U.S. PATENT DOCUMENTS

| | | | |
|---|---|---|---|
| 2009/0118440 | A1 | 5/2009 | Nakanishi et al. |
| 2011/0275112 | A1 | 11/2011 | Sarver, Jr. et al. |
| 2017/0160247 | A1* | 6/2017 | Van Loon ............ B01J 20/3293 |

FOREIGN PATENT DOCUMENTS

| | | | |
|---|---|---|---|
| JP | 3743004 | B2 | 2/2006 |
| JP | 2006-213780 | A | 8/2006 |
| JP | 2007-8996 | A | 1/2007 |
| JP | 2007-321122 | A | 12/2007 |
| JP | 5882851 | B2 | 3/2016 |

OTHER PUBLICATIONS

Wrtten Opinion (PCT/ISA/237) issued in PCT/JP2018/048241 dated Apr. 8, 2019.

\* cited by examiner

ROOM-TEMPERATURE-CURABLE ORGANOPOLYSILOXANE COMPOSITION, STRUCTURE, AND METHOD FOR ASSESSING CURED STATE OF SAID COMPOSITION

TECHNICAL FIELD

This invention relates to a room temperature curable (RTC) organopolysiloxane composition wherein the degree of cure is visually determinable or judgeable in terms of a color change with the progress of cure from the uncured state, a structure comprising the composition, and a method for judging the cured state of the composition.

BACKGROUND ART

Prior art compositions known to crosslink and cure through condensation reaction with airborne moisture include RTC organopolysiloxane compositions. The RTC organopolysiloxane compositions are widely used in the fields of building, transportation vehicles and electric/electronic parts because of their safety and durability and adhesion as rubber. Since the RTC organopolysiloxane compositions of moisture cure type rely on the cure system that crosslinking or curing reaction gradually takes place with airborne moisture, a certain time is necessary from application to the service site until the completion of cure. Therefore, in order to judge whether or not the applied composition has cured, there are available no judgment means other than touching with the finger or confirming the rubber-like state of the applied composition after a standby time.

However, when the degree of cure is confirmed by finger touch, there is a risk that the cured product is contaminated if contaminants are deposited on the finger. In the case of taking a standby time, there arise problems that the operation is prolonged at the sacrifice of productivity, and a place for storing the applied members is necessary. Further, when the curable composition is used as adhesive, the desired adhesive force is not available if the adherend is moved prior to cure. Then the degree of cure cannot be determined.

In addition, RTC organopolysiloxane compositions of moisture cure type are such that the degree of cure is affected by the amount of the composition used, the season (summer, winter or rainy season) of application, the shape of a member, and the like. For these reasons, it is quite difficult to accurately judge whether or not the RTC organopolysiloxane compositions of moisture cure type have completely cured. Therefore, on use of RTC organopolysiloxane compositions of moisture cure type, it is an important task to establish a method for simply determining the degree of cure.

To overcome the problem, recently Patent Document 1 (JP-A 2006-213780) discloses a combination of an organoxytitanium catalyst with an organic compound having at least one benzene ring-bonded hydroxyl group in the molecule. The reaction product of the titanium catalyst with hydroxyl group develops a color and undergoes hydrolysis with airborne moisture, so that the color of the composition vanishes or changes. Then the degree of cure is determinable by visual observation. The technique of Patent Document 1 is effective to RTC organopolysiloxane compositions of alcohol removal type, but not applicable to RTC organopolysiloxane compositions of oxime and acetone removal types which are commonly used. Thus the field to which the combination is applied to determine the degree of cure by visual observation is limited.

Patent Document 2 (JP 5882851) proposes a RTC organopolysiloxane composition having cobalt chloride added thereto. As the RTC organopolysiloxane composition cures with moisture, its color changes from gray to blue whereby the degree of cure is judgeable. However, cobalt chloride is highly toxic. The use of such toxic compounds is undesirable in view of the currently demanded protection of workers and environment.

Also, since the degree of color change of the composition with the progress of cure is not definite, it is not necessarily easy to accurately judge the degree of cure by visual observation.

Also Patent Document 3 (JP 3743004) describes a composition comprising an organic compound having at least one silicon group having a hydroxyl or hydrolyzable group, an alkaline compound, a benzotriazole derivative, and a plasticizer for helping the benzotriazole derivative dissolve, wherein the composition changes from yellow color to colorless with the progress of cure. This composition, however, needs to add the plasticizer in an amount at least equal to the organic compound having at least one silicon group having a hydroxyl or hydrolyzable group. The excessive addition of the plasticizer causes risks including degradation of rubber physical properties of the cured product and oil bleeding.

PRIOR ART DOCUMENTS

Patent Documents

Patent Document 1: JP-A 2006-213780
Patent Document 2: JP 5882851
Patent Document 3: JP 3743004

SUMMARY OF INVENTION

Technical Problem

An object of the invention, which has been made under the above-mentioned circumstances, is to provide a room temperature curable organopolysiloxane composition which undergoes a substantial color change while it cures with airborne moisture at room temperature, so that the degree of cure can be accurately and easily judged or visually determined, the composition being free of toxic compounds, being fully safe, and forming a cured product (silicone rubber cured product) having satisfactory physical properties, a structure comprising the composition, and a method for judging the cured state of the composition.

Solution to Problem

Making extensive investigations to attain the above object, the inventors have found that when a pH indicator, preferably a pH indicator capable of a color change in a basic region, and a silane coupling agent, preferably a basic silane coupling agent are added to a room temperature curable (RTC) resin composition of moisture cure type, a RTC organopolysiloxane composition adapted to undergo a definite color change with the progress of cure is obtained independent of the cure type (alcohol removal, oxime removal, acetone removal, acetic acid removal or amine removal type) of the composition and without the need for toxic compounds. The invention is predicated on this finding.

Accordingly, the invention provides a room temperature curable organopolysiloxane composition, a structure comprising a cured product layer of the composition, and a method for judging the cured state of the composition, as defined below.
[1]
A room temperature curable organopolysiloxane composition adapted to undergo a color change with the progress of cure from the uncured state, comprising:
(A) 100 parts by weight of an organopolysiloxane having the formula (1):
[Chem. 1]

$$HO(SiR_2O)_nH \quad (1)$$

wherein R which may be the same or different is an unsubstituted or halogen-substituted $C_1$-$C_{10}$ monovalent hydrocarbon group and n is an integer of at least 10 and/or the formula (2):

[Chem. 2]

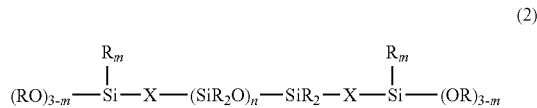

$$(RO)_{3-m}\underset{\underset{R_m}{|}}{Si}-X-(SiR_2O)_n-SiR_2-X-\underset{\underset{R_m}{|}}{Si}-(OR)_{3-m} \quad (2)$$

wherein R and n are as defined above, X is oxygen or a $C_2$-$C_5$ alkylene group, and m is independently 0 or 1,
(B) 0.1 to 50 parts by weight of an organosilicon compound having at least three silicon-bonded hydrolyzable groups per molecule and/or a partial hydrolytic condensate thereof, other than components (A), (C), and (D),
(C) 0.01 to 20 parts by weight of a curing catalyst,
(D) 0.1 to 10 parts by weight of a silane coupling agent, and
(E) 0.01 to 10 parts by weight of a pH indicator.
[2]
The organopolysiloxane composition of [1], further comprising (F) 0.1 to 20 parts by weight per 100 parts by weight of component (A) of a solvent.
[3]
The organopolysiloxane composition of [2], wherein a solution of component (E) in component (F) is uniformly dispersed in a mixture of components (A), (B), (C), and (D).
[4]
The organopolysiloxane composition of any one of [1] to [3], wherein component (D) is a basic silane coupling agent.
[5]
The organopolysiloxane composition of any one of [1] to [4], further comprising (G) 1 to 500 parts by weight per 100 parts by weight of component (A) of at least one inorganic filler.
[6]
The organopolysiloxane composition of any one of [1] to [5], wherein component (E) is a pH indicator capable of a color change in a basic region.
[7]
The organopolysiloxane composition of any one of [1] to [6], wherein the degree of cure is visually determinable in terms of a color change.
[8]
A structure comprising a cured product layer of the room temperature curable organopolysiloxane composition of any one of [1] to [7].
[9]
In conjunction with a process of curing the room temperature curable organopolysiloxane composition of any one of [1] to [7] with airborne moisture at room temperature into a silicone rubber cured product, a method for judging the cured state of the composition comprising the step of visually determining that the silicone rubber cured product has undergone a color change from the color of the composition in the uncured state.

Advantageous Effects of Invention

According to the invention, there are provided a RTC organopolysiloxane composition wherein the degree of cure can be visually determined or judged in terms of a color change with the progress of cure from the uncured state, a structure comprising the composition, and a method for judging the cured state of the composition.

Since the working efficiency and rubber physical properties remain unchanged from prior art RTC organopolysiloxane compositions, the inventive organopolysiloxane composition can be similarly used. The inventive organopolysiloxane composition can be advantageously used in the fields of building, transportation vehicles and electric/electronic parts and is useful especially in the fields where it is necessary to determine within a relatively short time whether or not the composition has cured (the fields of transportation vehicles and electric/electronic parts).

Specifically, the room temperature curable (RTC) organopolysiloxane composition of moisture cure type is endowed with the function of changing its color with the progress of cure from the uncured state and undergoing a definite color change at the completion of cure. As used herein, the term "room temperature" implies 23° C.±15° C.

Also, the RTC organopolysiloxane composition changes its color with the progress of cure from the uncured state, by which the degree of cure (or the completion of cure) can be visually determined.

The organopolysiloxane composition adapted to undergo a color change with the progress of cure is expected to mitigate the risk of contamination of the cured product by finger touch confirmation and to increase working efficiency.

Also, a solvent for dissolving component (E) may be added as component (F) to the RTC organopolysiloxane composition.

In a preferred embodiment of the RTC organopolysiloxane composition, a solution of component (E) in component (F) is uniformly dispersed in a mixture of components (A) to (D).

Component (E) previously dissolved in component (F) is more dispersible in a mixture of components (A) to (D).

An inorganic filler may be added as component (G) to the RTC organopolysiloxane composition as long as the function of the invention is not impaired.

Also provided is a structure comprising a cured product layer of the RTC organopolysiloxane composition or having the cured product layer bonded thereto. In conjunction with a process of curing the RTC organopolysiloxane composition with airborne moisture at room temperature into a silicone rubber cured product, a method for judging the cured state of the composition comprising the step of visually determining that the silicone rubber cured product has undergone a color change from the color of the composition in the uncured state is provided.

Then the RTC organopolysiloxane composition is advantageously used as adhesives to various members in transportation vehicles such as automobiles, adhesives or sealants to electric/electronic parts, coating agents or adhesives to fiber articles, glass articles, metal articles, and plastic articles, and sealing agents for buildings.

In the RTC organopolysiloxane composition, the mechanism of a color change following cure is a color change of a pH indicator. In general, a RTC organopolysiloxane composition cures with the progress of condensation reaction (crosslinking reaction) with airborne moisture (water). For storage of the composition in the uncured state, it is kept blocked from the air (ambient). When the composition is cured, it is exposed to the air containing moisture (water). Now that a pH indicator and a specific acidic or basic silane coupling agent are present (co-existing) in the composition, the composition adsorbs airborne moisture (water) to its surface, the adsorbed moisture (water) penetrates into the composition (or cured product), effective water is thus available in the composition (or cured product), the coexistence of water and the silane coupling agent induces a pH change, by which a color change occurs. However, in a resin composition of moisture cure type before the start of curing reaction and/or during the progress of curing reaction (before the completion of curing reaction), airborne water penetrating from the surface into the matrix of the composition is preferentially consumed by the curing reaction (condensation reaction) of the composition. This suggests that effective water contributing to the color development of the pH indicator is not available in the matrix of the composition. Then no color change occurs until the completion of curing reaction, and color development starts after the completion of curing reaction. That is, the inventive RTC organopolysiloxane composition maintains the color of the composition itself (typically colorless transparent or if a filler such as inorganic filler is contained, white color or non-white color of the filler), without any influence of color development of the pH indicator, from the uncured state until the completion of curing reaction, but changes its color to the color developed by the pH indicator at the time of completion of curing reaction or later. Therefore, as compared with the prior art, a definite change from uncured to cured state can be visually determined or judged by utilizing the color change mechanism of the invention.

DESCRIPTION OF EMBODIMENTS

Now the invention is described in detail.
<RTC Organopolysiloxane Composition>
The invention provides a room temperature curable (RTC) organopolysiloxane composition comprising components (A) to (E) defined below.
[Component (A)]
The inventive RTC organopolysiloxane composition contains an organopolysiloxane as component (A), which serves as a base polymer in the composition. The organopolysiloxane has the general formula (1) and/or (2).
[Chem. 3]

$$HO(SiR_2O)_nH \quad (1)$$

Herein R which may be the same or different is an unsubstituted or halogen-substituted $C_1$-$C_{10}$ monovalent hydrocarbon group and n is an integer of at least 10.

[Chem. 4]

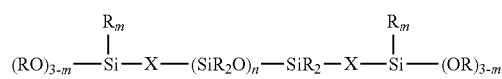

$$(RO)_{3-m}\!-\!\underset{\underset{R_m}{|}}{Si}\!-\!X\!-\!(SiR_2O)_n\!-\!SiR_2\!-\!X\!-\!\underset{\underset{R_m}{|}}{Si}\!-\!(OR)_{3-m} \quad (2)$$

Herein R which may be the same or different is an unsubstituted or halogen-substituted $C_1$-$C_{10}$ monovalent hydrocarbon group, n is an integer of at least 10, X is oxygen or a $C_2$-$C_5$ alkylene group, and m is independently 0 or 1.

In formulae (1) and (2), R is an unsubstituted or halogen-substituted $C_1$-$C_{10}$ monovalent hydrocarbon group. Examples include alkyl groups such as methyl, ethyl, and propyl, cycloalkyl groups such as cyclohexyl, alkenyl groups such as vinyl and allyl, aryl groups such as phenyl and tolyl, and substituted forms of the foregoing groups in which some carbon-bonded hydrogen is substituted by halogen, such as 3,3,3-trifluoropropyl. Inter alia, methyl, vinyl, phenyl and 3,3,3-trifluoropropyl are preferred, with methyl being most preferred. In formulae (1) and (2), a plurality of R may be the same or different.

The subscript n is an integer of at least 10, especially such an integer that the diorganopolysiloxane may have a viscosity at 25° C. of 25 to 500,000 mPa·s, preferably 500 to 100,000 mPa·s. As used herein, the viscosity is measured at 25° C. by a rotational viscometer (e.g., BL, BH, BS, cone plate type or rheometer). The value of n providing a viscosity in the range is typically an integer of about 10 to about 2,000, preferably about 20 to about 1,500, more preferably about 50 to about 1,000. As used herein, the degree of polymerization or molecular weight is a number average degree of polymerization or number average molecular weight as measured by gel permeation chromatography (GPC) using toluene as developing solvent versus polystyrene standards.

In formula (2), X is oxygen or a $C_2$-$C_5$ alkylene group, examples of which include ethylene, propylene and butylene. Of these, oxygen and ethylene are preferred as X.

The subscript m is independently 0 or 1.
[Component (B)]
The inventive RTC organopolysiloxane composition contains component (B) which serves as a crosslinker or curing agent and which is a hydrolyzable organosilicon compound having at least three silicon-bonded hydrolyzable groups per molecule and/or a partial hydrolytic condensate thereof, other than component (A) and components (C) and (D) to be described later. The organosilicon compound is preferably a hydrolyzable organosilane compound having the general formula (3) and/or a partial hydrolytic condensate thereof, i.e., an organosiloxane oligomer which is obtained from partial hydrolytic condensation of the organosilane compound, and contains at least two, preferably at least three residual hydrolyzable groups in the molecule.
[Chem. 5]

$$R^4_c SiR^5_{4-c} \quad (3)$$

Herein $R^4$ is an unsubstituted monovalent hydrocarbon group, $R^5$ is a hydrolyzable group, and c is 0 or 1, preferably 1.

In formula (3), exemplary of the hydrolyzable group $R^5$ are ketoxime, alkoxy, acyloxy, and alkenyloxy groups. Illustrative examples include $C_3$-$C_8$ ketoxime groups such as dimethylketoxime, methylethylketoxime, and methylisobutylketoxime, $C_1$-$C_4$, especially $C_1$-$C_2$ alkoxy groups such as methoxy, ethoxy, propoxy, isopropoxy, butoxy, isobutoxy, sec-butoxy and tert-butoxy, $C_2$-$C_4$ acyloxy groups such as acetoxy and propionoxy, and $C_2$-$C_4$ alkenyloxy groups such as vinyloxy, allyloxy, propenoxy and isopropenoxy.

The remaining silicon-bonded group $R^4$ other than the hydrolyzable group is not particularly limited as long as it is an unsubstituted monovalent hydrocarbon group. Exemplary are $C_1$-$C_{10}$ unsubstituted monovalent hydrocarbon groups including alkyl groups such as methyl, ethyl, propyl and butyl, alkenyl groups such as vinyl, and aryl groups such as phenyl. Inter alia, methyl, ethyl, vinyl and phenyl are preferred.

Examples of component (B) include ketoximesilanes such as tetrakis(methylethylketoxime)silane, methyltris(dimethylketoxime)silane, methyltris(methylethylketoxime)silane, ethyltris(methylethylketoxime)silane, methyltris(methylisobutylketoxime)silane, and vinyltris(methylethylketoxime)silane, alkoxysilanes such as methyltrimethoxysilane, vinyltrimethoxysilane, phenyltrimethoxysilane, tetramethoxysilane, vinyltriethoxysilane, and tetraethoxysilane, acetoxysilanes such as methyltriacetoxysilane and vinyltriacetoxysilane, and isopropenoxysilanes such as methyltriisopropenoxysilane, vinyltriisopropenoxysilane, and phenyltriisopropenoxysilane, as well as partial hydrolytic condensates thereof. These compounds may be used alone or in admixture of two or more.

Notably, component (B) is clearly distinguished from component (A) in that component (B) does not contain a linear structure of repeating diorganosiloxane units of the formula: $(SiR_2O)_n$ in the molecule, and also clearly distinguished from component (D) in that component (B) does not contain a monovalent hydrocarbon group having a functional group containing a heteroatom such as nitrogen, oxygen or sulfur in the molecule.

Component (B) is used in an amount of 0.1 to 50 parts by weight, preferably 5 to 30 parts by weight per 100 parts by weight of component (A). Less than 0.1 part by weight of component (B) fails to achieve sufficient crosslinking or to provide a composition having the desired rubber elasticity. In excess of 50 parts by weight, the cured product tends to be degraded in mechanical properties.

[Component (C)]

The inventive RTC organopolysiloxane composition contains a curing catalyst as component (C). The curing catalyst used herein may be selected from condensation catalysts commonly used in the art as a cure accelerator for moisture-curable (or condensation-curable) compositions. Examples include organotin compounds such as dibutyltin methoxide, dibutyltin diacetate, dibutyltin dioctoate, dibutyltin dilaurate, dioctyltin dilaurate, dioctyltin dioctoate, dimethyltin dimethoxide, and dimethyltin diacetate; organotitanium compounds such as tetrapropyl titanate, tetrabutyl titanate, tetra-2-ethylhexyl titanate, and dimethoxytitanium diacetylacetonate; amine compounds such as hexylamine, 3-aminopropyltrimethoxysilane, and tetramethylguanidylpropyltrimethoxysilane, and salts thereof. These compounds may be used alone or in admixture of two or more.

Component (C) is used in an amount of 0.01 to 20 parts by weight, preferably 0.05 to 5 parts by weight, more preferably 0.1 to 2 parts by weight per 100 parts by weight of component (A). If the amount of component (C) is below the lower limit of 0.01 part by weight, no catalytic effect is obtained. If the amount of component (C) exceeds the upper limit of 20 parts by weight, the RTC organopolysiloxane composition may become less adhesive or lose shelf stability.

[Component (D)]

The inventive RTC organopolysiloxane composition contains a silane coupling agent as component (D), which is a functionality-containing hydrolyzable silane compound having a monovalent hydrocarbon group having a functional group containing a heteroatom such as nitrogen, oxygen or sulfur and a plurality of (typically 2 or 3) hydrolyzable groups (so-called carbon-functional silane compound) and/or a partial hydrolytic condensate thereof. The silane coupling agent is added for the purposes of adjusting the pH of the composition (i.e., controlling the pH to a specific range) for thereby promoting a color change of the pH indicator at the completion of cure and at the same time, improving the adhesion of the cured product (silicone rubber) obtained from curing of the composition.

Any of commonly used silane coupling agents may be used as component (D). Exemplary of component (D) are γ-aminopropyltriethoxysilane, γ-aminopropyltrimethoxysilane, γ-aminopropylmethyldimethoxysilane, γ-aminopropylmethyldiethoxysilane, N-β-aminoethyl-γ-aminopropylmethyldimethoxysilane, N-benzyl-γ-aminopropyltriethoxysilane, N-phenyl-γ-aminopropyltrimethoxysilane, β-aminoethylaminomethylphenethyltrimethoxysilane, N-[m-aminomethylphenylmethyl]-γ-aminopropyltrimethoxysilane, 2-(3,4-epoxycyclohexyl)ethyltrimethoxysilane, 3-glycidoxypropyltrimethoxysilane, 3-glycidoxypropylmethyldiethoxysilane, 3-glycidoxypropyltriethoxysilane, 3-methacryloxypropyltrimethoxysilane, 3-methacryloxypropyltriethoxysilane, 3-methacryloxypropylmethyldimethoxysilane, 3-methacryloxypropylmethyldiethoxysilane, 3-mercaptopropyltrimethoxysilane, 3-mercaptopropylmethyldimethoxysilane, tetramethylguanidylpropyltrimethoxysilane, and tetramethylguanidylpropylmethyldimethoxysilane as well as partial/co-hydrolyzates thereof. These compounds may be used alone or in admixture of two or more.

Preferred among various types of component (D) are basic silane coupling agents, especially those having at least one primary amino group, secondary amino group, tertiary amino group or guanidine group per molecule. Examples of the silane coupling agents (preferably basic silane coupling agents, especially amino group-containing silane coupling agents) include γ-aminopropyltriethoxysilane, γ-aminopropyltrimethoxysilane, γ-aminopropylmethyldimethoxysilane, γ-aminopropylmethyldiethoxysilane, N-β-aminoethyl-γ-aminopropylmethyldimethoxysilane, N-benzyl-γ-aminopropyltrimethoxysilane, N-phenyl-γ-aminopropyltrimethoxysilane, β-aminoethylaminomethylphenethyltrimethoxysilane, N-[m-aminomethylphenylmethyl]-γ-aminopropyltrimethoxysilane, tetramethylguanidylpropyltrimethoxysilane, and tetramethylguanidylpropylmethyldimethoxysilane, which may be used alone in admixture. The basic silane coupling agent may be used in combination with a non-basic, especially neutral silane coupling agent.

Component (D) is used in an amount of 0.1 to 10 parts by weight, preferably 0.3 to 8 parts by weight, more preferably 0.5 to 5 parts by weight per 100 parts by weight of component (A). If the amount of component (D) is below the lower limit of 0.1 part by weight, no sufficient color change or adhesion may be obtained. If the amount of component (D) exceeds the upper limit of 10 parts by weight, the RTC organopolysiloxane composition may have degraded physical properties or lose shelf stability.

[Component (E)]

The inventive RTC organopolysiloxane composition contains a pH indicator as component (E). Component (E) is used in combination with component (D) or silane coupling agent, preferably basic silane coupling agent, for the purpose of endowing the moisture cure type resin with the function of inducing a color change at the completion of cure.

Any of commonly used pH indicators may be selected as component (E). The pH indicator as component (E) may be either solid or liquid at room temperature, preferably liquid in view of dispersion and color change.

The pH indicator as component (E) is preferably capable of a color change in the basic pH region. Specifically the color change pH region is 7 to 14, more preferably 7.5 to 13, even more preferably 8 to 12.

Examples of the pH indicator having the above color change pH region as component (E) include phenolphthalein, thymolphthalein, Alizarine Yellow R, cresolphthalein, Cresol Red, Phenol Red, and Bromothymol Blue, which may be used alone or in admixture. The pH indicator as component (E) may be added in the form of a solution of the indicator in a solvent as component (F).

Component (E) is used in amount of 0.01 to 10 parts, by weight, preferably 0.1 to 8 parts by weight, more preferably 1 to 6 parts by weight per 100 parts by weight of component (A). If the amount of component (E) is below the lower limit of 0.01 part by weight, no sufficient color change may be obtained. If the amount of component (E) exceeds the upper limit of 10 parts by weight, the pH indicator may precipitate out on the surface of the cured product of the RTC organopolysiloxane composition or the cured product may be degraded in outer appearance.

[Component (F)]

The inventive RTC organopolysiloxane composition contains a solvent as optional component (F), which serves to dissolve component (E) therein. When component (E) alone is not well dispersed in component (A), its dispersion may be facilitated by adding component (F) or adding a solution of component (E) in component (F).

Any of commonly used organic solvents may be used as component (F). Exemplary of component (F) are polar and non-polar organic solvents including methanol, ethanol, acetone, cyclohexanone, tetrahydrofuran, benzene, toluene, xylene, dimethylformamide, acetonitrile, ethyl acetate, cyclohexanone, and methylcyclohexane, which may be used alone or in admixture.

When used, component (F) is blended in an amount of 0.1 to 20 parts by weight, preferably 0.5 to 15 parts by weight, more preferably 1 to 10 parts by weight per 100 parts by weight of component (A). If the amount of component (F) is below the lower limit of 0.1 part by weight, it may fail to exert a sufficient effect of dispersing component (E). If the amount of component (F) exceeds the upper limit of 20 parts by weight, the cured product of the RTC organopolysiloxane composition may have degraded physical properties.

[Component (G)]

Component (G) which is optional is an inorganic filler. It may be selected from reinforcing fillers and non-reinforcing fillers for imparting rubber physical properties to the cured product of the RTC organopolysiloxane composition adapted to undergo a color change with the progress of cure.

Exemplary of the filler are the following inorganic fillers which have been surface treated or not. Included are silica fillers, for example, dry silicas such as fired silica and fumed silica, and wet silicas such as precipitated silica and sol-gel method silica; carbon black, talc, bentonite, calcium carbonate, zinc carbonate, magnesium carbonate, calcium oxide, zinc oxide, magnesium oxide, aluminum oxide, and aluminum hydroxide. Of these, preferred are calcium carbonate, fumed silica, precipitated silica, carbon black, and aluminum oxide. More preferred are calcium carbonate, fumed silica, precipitated silica, carbon black, and aluminum oxide which have been surface treated to be hydrophobic. It is preferred herein that the inorganic fillers have a low water content. Although the type and amount of a surface treating agent and the treatment method are not particularly limited, typically well-known treatment methods using treating agents such as organosilicon compounds such as chlorosilanes, alkoxysilanes and organosilazanes, and fatty acids, paraffins, silane coupling agents and titanium coupling agents are applicable. These agents may be used alone or in admixture.

When used, the amount of component (G) blended is in the range of 1 to 500 parts by weight, preferably 20 to 300 parts by weight per 100 parts by weight of the organopolysiloxane as component (A). If the amount of component (G) is below the lower limit of 1 part by weight, the resulting RTC organopolysiloxane composition may not have sufficient rubber strength. If the amount of component (G) exceeds the upper limit of 500 parts by weight, the composition may become difficult to dispense from a cartridge and lose storage stability.

In the RTC organopolysiloxane composition, any of well-known additives other than the foregoing components may be used as long as the benefits of the invention are not impaired. Suitable additives include thixotropic agents such as polyether, and plasticizers such as silicone oil and isoparaffin. If necessary, there may be added coloring agents such as pigments, dyes and fluorescent brighteners, biological active additives such as mildew-proofing agents, antibacterial agents, marine organisms repellents, bleed oils such as phenyl-silicone oil and fluoro-silicone oil, surface modifiers such as silicone-immiscible organic liquids, industrial volatile fluids, low-boiling isoparaffin, and organic resin fillers.

<Preparation and Molding of Composition>

The RTC organopolysiloxane composition of the invention may be prepared by mixing the essential components, components (A) to (E), and optional components, components (F) and (G) on a well-known mixer such as a kneader, Banbury mixer or two-roll mill. As previously mentioned, when component (E) alone is not readily dispersed in component (A), its dispersion can be facilitated by adding component (F) or adding a solution of component (E) in component (F). Herein, preferably a solution of component (E) in component (F) is uniformly dispersed in a mixture of components (A) to (D).

A suitable molding method may be selected from well-known ones in accordance with the shape and size of the desired molded product. Exemplary molding methods include cast molding, compression molding, injection molding, calendering, and extrusion molding. The molded product typically has a thickness of 0.1 to 100 mm, preferably 1 to 50 mm.

The curing conditions correlating to the color of the composition may be well-known conditions for a particular molding method. In the case of curing in an atmosphere of 23±15° C. and 50±20% RH, preferably 23±5° C. and 50±10% RH, color may be visually observed with a lapse of time, typically after 1 to 10 days, preferably 3 to 7 days from the initial molding. The cured product of the composition should have cured to finger touch or have satisfactory rubber physical properties and contain few agglomerates. Notably, rubber physical properties (hardness, elongation and tensile strength) are evaluated according to JIS K6249.

<Structure Comprising the Composition and Method for Judging the Cured State>

The invention also provides a structure comprising a cured product of the RTC organopolysiloxane composition. Suitable structures include engine units, water pumps and transmission units in automobile and other transportation vehicles, in the form of fiber articles, glass articles, metal articles and plastic articles which are sealed, bonded or coated with the cured product of the composition; engine control units and other electric/electronic parts in the form of electronic substrates, housings and other parts which are sealed, bonded or coated with the cured product of the composition; and building members such as building exterior walls, window frames, wet items (kitchen, lavatory and bath wares) and showcases, in the form of fiber articles, glass articles, metal articles and plastic articles which are sealed, bonded or coated with the cured product of the composition. Particularly useful structures are transportation vehicle parts and electric/electronic parts which need to determine the cured state within a relatively short time.

Also the invention provides a method for judging the cured state of the RTC organopolysiloxane composition. In conjunction with a process of curing the RTC organopolysiloxane composition with airborne moisture at room temperature into a silicone rubber cured product, the invention provides a method for judging the cured state of the composition comprising the step of visually determining that the silicone rubber cured product has undergone a color change from the color of the composition in the uncured state. The method enables to readily judge by visual observation whether the composition is uncured or cured. Notably, the mechanism of color change resulting from cure is as discussed above.

Accordingly, the RTC organopolysiloxane composition is advantageously used in applications, for example, as adhesives for various members in automobiles and other transportation vehicles, sealing agents, adhesives and moisture-proof coating agents for electric/electronic parts, coating agents and adhesives for fiber articles, glass articles, metal articles and plastic articles, and sealants for building members. There are also provided a useful structure and a method for readily judging the uncured/cured state by visual observation.

EXAMPLES

Synthesis Examples, Examples and Comparative Examples are given below for illustrating the invention, but the invention is not limited by Examples. The viscosity is measured by a rotational viscometer.

Colorant Preparation Example 1

In a 300-mL round-bottom flask with a stirrer, 10 parts by weight of phenolphthalein and 90 parts by weight of tetrahydrofuran (THF) were stirred at room temperature for 1 hour, yielding a uniform liquid mixture, designated Colorant 1.

Colorant Preparation Example 2

In a 300-mL round-bottom flask with a stirrer, 10 parts by weight of thymolphthalein and 90 parts by weight of THF were stirred at room temperature for 1 hour, yielding a uniform liquid mixture, designated Colorant 2.

Example 1

To (A) 100 parts by weight of silanol-endcapped polydimethylsiloxane having a viscosity at 23° C. of 50,000 mPa·s, (G) 2 parts by weight of fumed silica surface-treated with dimethyldichlorosilane was added and mixed. Then (B) 10 parts by weight of vinyltris(methylethylketoxime)silane was added to the mixture and mixed under reduced pressure. To the mixture, (D) 1 part by weight of 3-aminopropyltrimethoxysilane (tradename KBM-903, by Shin-Etsu Chemical Co., Ltd.), (C) 0.1 part by weight of dioctyltin diversatate, and (E) 0.5 part by weight of phenolphthalein were added and fully mixed under reduced pressure, yielding Composition 1.

Example 2

To (A) 100 parts by weight of silanol-endcapped polydimethylsiloxane having a viscosity at 23° C. of 50,000 mPa·s, (G) 100 parts by weight of ground calcium carbonate surface-treated with paraffin (tradename MC Coat P-20, by Maruo Calcium Co., Ltd.) and (G) 2 parts by weight of fumed silica surface-treated with dimethyldichlorosilane were added and mixed. Then (B) 10 parts by weight of vinyltris(methylethylketoxime)silane was added to the mixture and mixed under reduced pressure. To the mixture, (D) 1 part by weight of 3-aminopropyltrimethoxysilane (tradename KBM-903, by Shin-Etsu Chemical Co., Ltd.), (C) 0.1 part by weight of dioctyltin diversatate, and (E) 0.5 part by weight of phenolphthalein were added and fully mixed under reduced pressure, yielding Composition 2.

Example 3

To (A) 100 parts by weight of silanol-endcapped polydimethylsiloxane having a viscosity at 23° C. of 50,000 mPa·s, (G) 100 parts by weight of ground calcium carbonate surface-treated with paraffin (tradename MC Coat P-20, by Maruo Calcium Co., Ltd.) and (G) 2 parts by weight of fumed silica surface-treated with dimethyldichlorosilane were added and mixed. Then (B) 10 parts by weight of vinyltris(methylethylketoxime)silane was added to the mixture and mixed under reduced pressure. To the mixture, (D) 1 part by weight of 3-aminopropyltrimethoxysilane (tradename KBM-903, by Shin-Etsu Chemical Co., Ltd.), (C) 0.1 part by weight of dioctyltin diversatate, and (E+F) 5 parts by weight of Colorant 1 were added and fully mixed under reduced pressure, yielding Composition 3.

Example 4

To (A) 100 parts by weight of silanol-endcapped polydimethylsiloxane having a viscosity at 23° C. of 50,000 mPa·s, (G) 100 parts by weight of ground calcium carbonate surface-treated with paraffin (tradename MC Coat P-20, by Maruo Calcium Co., Ltd.) and (G) 2 parts by weight of fumed silica surface-treated with dimethyldichlorosilane were added and mixed. Then (B) 10 parts by weight of vinyltris(methylethylketoxime)silane was added to the mixture and mixed under reduced pressure. To the mixture, (D) 1 part by weight of 3-aminopropyltrimethoxysilane (tradename KBM-903, by Shin-Etsu Chemical Co., Ltd.), (C) 0.1 part by weight of dioctyltin diversatate, and (E+F) 5 parts by weight of Colorant 2 were added and fully mixed under reduced pressure, yielding Composition 4.

Example 5

To (A) 100 parts by weight of silanol-endcapped polydimethylsiloxane having a viscosity at 23° C. of 50,000 mPa·s, (G) 100 parts by weight of ground calcium carbonate surface-treated with paraffin (tradename MC Coat P-20, by Maruo Calcium Co., Ltd.) and (G) 2 parts by weight of fumed silica surface-treated with dimethyldichlorosilane were added and mixed. Then (B) 10 parts by weight of vinyltris(isopropenoxy)silane was added to the mixture and mixed under reduced pressure. To the mixture, (D) 1 part by weight of N-2-(aminoethyl)-3-aminopropyltrimethoxysilane (tradename KBM-603, by Shin-Etsu Chemical Co., Ltd.), (C) 1 part by weight of tetramethylguanidylpropyltrimethoxysilane, and (E+F) 5 parts by weight of Colorant 1 were added and fully mixed under reduced pressure, yielding Composition 5.

Example 6

To (A) 100 parts by weight of silanol-endcapped polydimethylsiloxane having a viscosity at 23° C. of 50,000 mPa·s, (G) 100 parts by weight of ground calcium carbonate surface-treated with paraffin (tradename MC Coat P-20, by Maruo Calcium Co., Ltd.) and (G) 2 parts by weight of fumed silica surface-treated with dimethyldichlorosilane were added and mixed. Then (B) 10 parts by weight of vinyltrimethoxysilane was added to the mixture and mixed under reduced pressure. To the mixture, (D) 1 part by weight of N-2-(aminoethyl)-3-aminopropyltrimethoxysilane (tradename KBM-603, by Shin-Etsu Chemical Co., Ltd.), (C) 0.1 part by weight of dioctyltin diversatate, and (E+F) 5 parts by weight of Colorant 1 were added and fully mixed under reduced pressure, yielding Composition 6.

Comparative Example 1

To (A) 100 parts by weight of silanol-endcapped polydimethylsiloxane having a viscosity at 23° C. of 50,000 mPa·s, (G) 100 parts by weight of ground calcium carbonate surface-treated with paraffin (tradename MC Coat P-20, by Maruo Calcium Co., Ltd.) and (G) 2 parts by weight of fumed silica surface-treated with dimethyldichlorosilane were added and mixed. Then (B) 10 parts by weight of vinyltris(methylethylketoxime)silane was added to the mixture and mixed under reduced pressure. To the mixture, (D) 1 part by weight of 3-aminopropyltrimethoxysilane (tradename KBM-903, by Shin-Etsu Chemical Co., Ltd.) and (C) 0.1 part by weight of dioctyltin diversatate were added and fully mixed under reduced pressure, yielding Composition 7.

Comparative Example 2

To (A) 100 parts by weight of silanol-endcapped polydimethylsiloxane having a viscosity at 23° C. of 50,000 mPa·s, (G) 100 parts by weight of ground calcium carbonate surface-treated with paraffin (tradename MC Coat P-20, by Maruo Calcium Co., Ltd.) and (G) 2 parts by weight of fumed silica surface-treated with dimethyldichlorosilane were added and mixed. Then (B) 10 parts by weight of vinyltris(methylethylketoxime)silane was added to the mixture and mixed under reduced pressure. To the mixture, (C) 0.1 part by weight of dioctyltin diversatate and (E) 0.5 part by weight of phenolphthalein were added and fully mixed under reduced pressure, yielding Composition 8.

Comparative Example 3

To (A) 100 parts by weight of silanol-endcapped polydimethylsiloxane having a viscosity at 23° C. of 50,000 mPa·s, (G) 100 parts by weight of ground calcium carbonate surface-treated with paraffin (tradename MC Coat P-20, by Maruo Calcium Co., Ltd.) and (G) 2 parts by weight of fumed silica surface-treated with dimethyldichlorosilane were added and mixed. Then (B) 10 parts by weight of vinyltris(methylethylketoxime)silane was added to the mixture and mixed under reduced pressure. To the mixture, (D) 1 part by weight of 3-aminopropyltrimethoxysilane (tradename KBM-903, by Shin-Etsu Chemical Co., Ltd.), (C) 0.1 part by weight of dioctyltin diversatate and (E) 15 parts by weight of phenolphthalein were added and fully mixed under reduced pressure, yielding Composition 9.

The compositions of Examples and Comparative Examples were molded into sheets of 2 mm thick. The color of the compositions was evaluated by visual observation at the initial time of molding into 2-mm thick sheets, after curing for 5 hours, and after curing for 7 days, both in an atmosphere of 23±2° C. and 50±5% RH, from which a color change was determined. The cured products (silicone rubber) were evaluated "passed" when the cured product, after 5 hours from the sheet molding, underwent a color change, was found cured to finger touch, had satisfactory sheet physical properties, and contained few agglomerates. Rubber physical properties (hardness, elongation and tensile strength) were measured according to JIS K6249 for comparison. The results are shown in Table 1.

TABLE 1

| | | Component (pbw) | Example 1 | Example 2 | Example 3 | Example 4 | Example 5 | Example 6 | Comparative Example 1 | Comparative Example 2 | Comparative Example 3 |
|---|---|---|---|---|---|---|---|---|---|---|---|
| A | A-1 | silanol-endcapped polydimethylsiloxane of 50,000 mPa·s | 100 | 100 | 100 | 100 | 100 | 100 | 100 | 100 | 100 |
| B | B-1 | vinyltris(methylethylketoxime)silane (oxime-removal curing agent) | 10 | 10 | 10 | 10 | | | 10 | 10 | 10 |
| | B-2 | vinyltris(isopropenoxy)silane (acetone-removal curing agent) | | | | | 10 | | | | |
| | B-3 | vinyltrimethoxysilane (alcohol-removal curing agent) | | | | | | 10 | | | |
| C | C-1 | dioctyltin diversatate | 0.1 | 0.1 | 0.1 | 0.1 | | 0.1 | 0.1 | 0.1 | 0.1 |
| | C-2 | tetramethylguanidylpropyltrimethoxysilane | | | | | 1 | | | | |
| D | D-1 | 3-aminopropyltrimethoxysilane | 1 | 1 | 1 | 1 | | | 1 | | 1 |
| | D-2 | N-2-(aminoethyl)-3-aminopropyltrimethoxysilane | | | | | 1 | 1 | | | |

TABLE 1-continued

|  |  | Component (pbw) | Example 1 | Example 2 | Example 3 | Example 4 | Example 5 | Example 6 | Comparative Example 1 | Comparative Example 2 | Comparative Example 3 |
|---|---|---|---|---|---|---|---|---|---|---|---|
| E + F | E-1 | phenolphthalein | 0.5 | 0.5 |  |  |  |  |  | 0.5 | 15 |
|  | E + F-1 | Colorant 1 (10 wt % phenolphthalein in THF) |  |  | 5 |  | 5 | 5 |  |  |  |
|  | E + F-2 | Colorant 2 (10 wt % thymolphthalein in THF) |  |  |  | 5 |  |  |  |  |  |
| G | G-1 | MC Coat P-20 |  | 100 | 100 | 100 | 100 | 100 | 100 | 100 | 100 |
|  | G-2 | fumed silica | 2 | 2 | 2 | 2 | 2 | 2 | 2 | 2 | 2 |
| Cured physical properties | Hardness (type A) |  | 18 | 43 | 42 | 42 | 44 | 41 | 43 | 38 | 45 |
|  | Elongation (%) |  | 190 | 360 | 350 | 380 | 320 | 340 | 350 | 420 | 190 |
|  | Tensile strength (MPa) |  | 0.8 | 1.8 | 1.8 | 1.8 | 1.7 | 1.7 | 1.8 | 1.9 | 1.3 |
|  | Color (initial) |  | white | white | white | white | white | white | white | white | white |
|  | Color (5 hr) |  | pink | pale pink | pale pink | pale blue | pale pink | pale pink | white | white | pale pink |
|  | Color (7 days) |  | pink | pink | pink | blue | pink | pink | white | white | pink |
|  | Outer appearance (pimple) |  | Δ | Δ | ○ | ○ | ○ | ○ | ○ | ○ | X |
|  | Judgment |  | Passed | Passed | Passed | Passed | Passed | Passed | Failed | Failed | Failed |

As seen from Table 1, the compositions of Examples 1 to 6 underwent a color change with the progress of cure, and reached substantial completion of cure after 5 hours from the sheet molding. Physical properties were not degraded by adding specific amounts of components (E) and (F). The compositions of Examples 1 and 2 having component (E) alone added thereto showed some pimples on the rubber sheet surface. The compositions of Examples 3 to 6 having a solution of component (E) in component (F) added thereto showed no pimples on the rubber sheet surface, that is, a smooth surface. The compositions of Comparative Examples 1 and 2 not containing component (E) or (D) underwent no color change resulting from curing. The composition of Comparative Example 3 containing an excess of component (E) was degraded in outer appearance and sheet physical properties, as compared with the composition of Example 2 having the same formulation except component (E). The organopolysiloxane compositions capable of a color change with the progress of cure within the scope of the invention make it possible to determine by visual observation whether or not the composition is cured (i.e., to judge the cured state).

The invention is not limited to the above-described embodiments. While the embodiments are exemplary, all embodiments having substantially the same construction as the technical concept and achieving the same effects and benefits as the invention fall within the scope of the appended claims.

The invention claimed is:

1. A room temperature curable organopolysiloxane composition adapted to undergo a color change with the progress of cure from the uncured state, comprising:
(A) 100 parts by weight of an organopolysiloxane having the formula (1):
[Chem. 1]

wherein R which may be the same or different is an unsubstituted or halogen-substituted $C_1$-$C_{10}$ monovalent hydrocarbon group and n is an integer of at least 10 and/or the formula (2):

[Chem. 2]

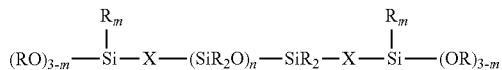

wherein R and n are as defined above, X is oxygen or a $C_2$-$C_5$ alkylene group, and m is independently 0 or 1,
(B) 0.1 to 50 parts by weight of an organosilicon compound having at least three silicon-bonded hydrolyzable groups per molecule and/or a partial hydrolytic condensate thereof, other than components (A), (C), and (D),
(C) 0.01 to 20 parts by weight of a curing catalyst,
(D) 0.1 to 10 parts by weight of a silane coupling agent, and
(E) 0.01 to 10 parts by weight of a pH indicator; and
when cured gives a silicone rubber cured product having a TYPE A hardness of 18 to 44 according to JIS K6249.

2. The organopolysiloxane composition of claim 1, further comprising (F) 0.1 to 20 parts by weight per 100 parts by weight of component (A) of a solvent.

3. The organopolysiloxane composition of claim 2, wherein a solution of component (E) in component (F) is uniformly dispersed in a mixture of components (A), (B), (C), and (D).

4. The organopolysiloxane composition of claim 1, wherein component (D) is a basic silane coupling agent.

5. The organopolysiloxane composition of claim 1, further comprising (G) 1 to 500 parts by weight per 100 parts by weight of component (A) of at least one inorganic filler.

6. The organopolysiloxane composition of claim 1, wherein component (E) is a pH indicator capable of a color change in a basic region.

7. The organopolysiloxane composition of claim 1, wherein the degree of cure is visually determinable in terms of a color change.

8. A structure comprising a cured product layer of the room temperature curable organopolysiloxane composition of claim 1.

9. In conjunction with a process of curing the room temperature curable organopolysiloxane composition of claim 1 with airborne moisture at room temperature into a silicone rubber cured product, a method for judging the cured state of the composition comprising the step of visually determining that the silicone rubber cured product has undergone a color change from the color of the composition in the uncured state.

* * * * *